(12) United States Patent
Kogan et al.

(10) Patent No.: US 6,441,895 B1
(45) Date of Patent: Aug. 27, 2002

(54) METHOD AND APPARATUS FOR PRECISION THREE-DIMENSIONAL OPTO-MECHANICAL ASSEMBLY

(75) Inventors: Yakov Kogan, Wayland; Daryoosh Vakhshoori, Cambridge, both of MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/789,020

(22) Filed: Feb. 20, 2001

Related U.S. Application Data

(60) Provisional application No. 60/233,848, filed on Sep. 20, 2000.

(51) Int. Cl.[7] .......................... G01B 9/00; G01B 11/26; G01C 1/00
(52) U.S. Cl. .................... 356/127; 356/152.1; 356/153
(58) Field of Search .............................. 356/127, 152.1, 356/153, 399, 400, 121

(56) References Cited

U.S. PATENT DOCUMENTS

| | | | | |
|---|---|---|---|---|
| 3,712,740 A | * | 1/1973 | Hennings | 356/152 |
| 3,782,829 A | * | 1/1974 | Herriott | 356/127 |
| 3,800,388 A | * | 4/1974 | Borner et al. | 29/200 |
| 3,816,000 A | * | 6/1974 | Fiedler | 356/152 |
| 3,867,038 A | * | 2/1975 | Westell | 356/172 |
| 4,621,924 A | * | 11/1986 | Williams | 356/153 |
| 4,811,062 A | * | 3/1989 | Tabata et al. | 356/152 |
| 4,916,324 A | * | 4/1990 | Meier | 250/561 |
| 5,080,482 A | * | 1/1992 | Benz et al. | 356/127 |
| 5,453,606 A | * | 9/1995 | Hojo | 250/201.1 |
| 5,638,169 A | * | 6/1997 | Hollmann et al. | 356/127 |

\* cited by examiner

*Primary Examiner*—Thomas H. Tarcza
*Assistant Examiner*—Brian K Andrea

(57) ABSTRACT

A method for achieving three-dimensional alignment of a pair of optical components, and apparatus for supporting such method, is initiated by fixing one of the optical components at a selected location on a semiconductor substrate. Subsequently, the other optical component and its associated submount are attached to a pair of coupled motion stages. A reference signal, to which the first optical component has been aligned, is transmitted to the other component and to a detector. That detector is positioned to measure changes in a selected characteristic of the reference signal, such as changes in optical power, as the position of the second optical component and its submount are manipulated. Through the use of a feedback loop, the second component and submount are moved in a pattern until an optimal alignment is converged upon.

19 Claims, 3 Drawing Sheets

METHOD AND APPARATUS FOR PRECISION THREE-DIMENSIONAL OPTO-MECHANICAL ASSEMBLY

This non-provisional application claims the benefit of U.S. Provisional Application No. 60/233 848 filed on Sep. 20, 2000 titled "Precision Three-Dimensional Opto-Mechanical Assembly Method and Apparatus" by inventors Yakov Kogan and Daryoosh Vakhshoori.

BACKGROUND OF THE INVENTION

As it is known in the optical communications art, light signals can be modulated in accordance with associated data signals such that the information is optically conveyed between transmitter and receiver devices. In order for that optical data to be efficiently transmitted, each of the intervening optical components should be in a precise, optimal alignment. Such alignment is typically achieved by transmitting an exemplary light beam through the optical components. As the light beam exits the arrangement of optical components, a measurement is performed of its parameters such as power or spectrum for instance. The optical components can be subsequently moved in relation to each other until an optimum combination of the output light parameters is attained. The process usually has many steps and is fairly slow. Sometimes the duration of the process becomes prohibitive to large volume manufacturing. It is especially true when three or more dimensional alignment is required.

Once an optimal alignment of the optical components is achieved, the components are fixed in place using a variety of methods. One of those methods, that is widely used, includes the use of ultra-violet (UV) curable epoxy. The epoxy is disposed on a portion of each component which will enable it to be rigidly fixed to a substrate or other structure. The UV source is subsequently turned on until the epoxy has cured. It is readily apparent that the optical components must remain precisely fixed until the epoxy has cured. It is also important to keep the epoxy layers as thin as possible to minimize the influence of the epoxy shrinkage during cure on the optical alignment.

A system is needed that allows fast and precise three-dimensional alignment of components and also allows the components to be held motionless while the epoxy is cured.

SUMMARY OF THE INVENTION

In accordance with an aspect of the present invention, a method and apparatus are provided for optimally aligning a number of optical components in three dimensions.

More specifically, a method is disclosed that is initiated by fixing one of the optical components at a selected location on a semiconductor substrate. Subsequently, the other optical component and its associated submount are attached to a pair of coupled motion stages. A reference light beam, to which the first optical component has been aligned, is transmitted to the other component and to a detector. That detector is positioned to measure changes in a selected characteristic of the reference signal, such as changes in optical power, as the position of the second optical component is manipulated. Through the use of a feedback loop, the second component and submount are moved in a pattern until an optimal alignment is converged upon.

In accordance with another aspect of the invention, the detector monitors a characteristic of the reference signal and, based upon that measurement, a determination is made regarding the location of the optical component which maximizes that characteristic. That process is repeated while the distance between the components is changed until optimal alignment is achieved.

In accordance with a further aspect of the invention, the optical component and its associated submount are fixed on the device substrate at the point of optimal alignment.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE INVENTION

Figure 1:
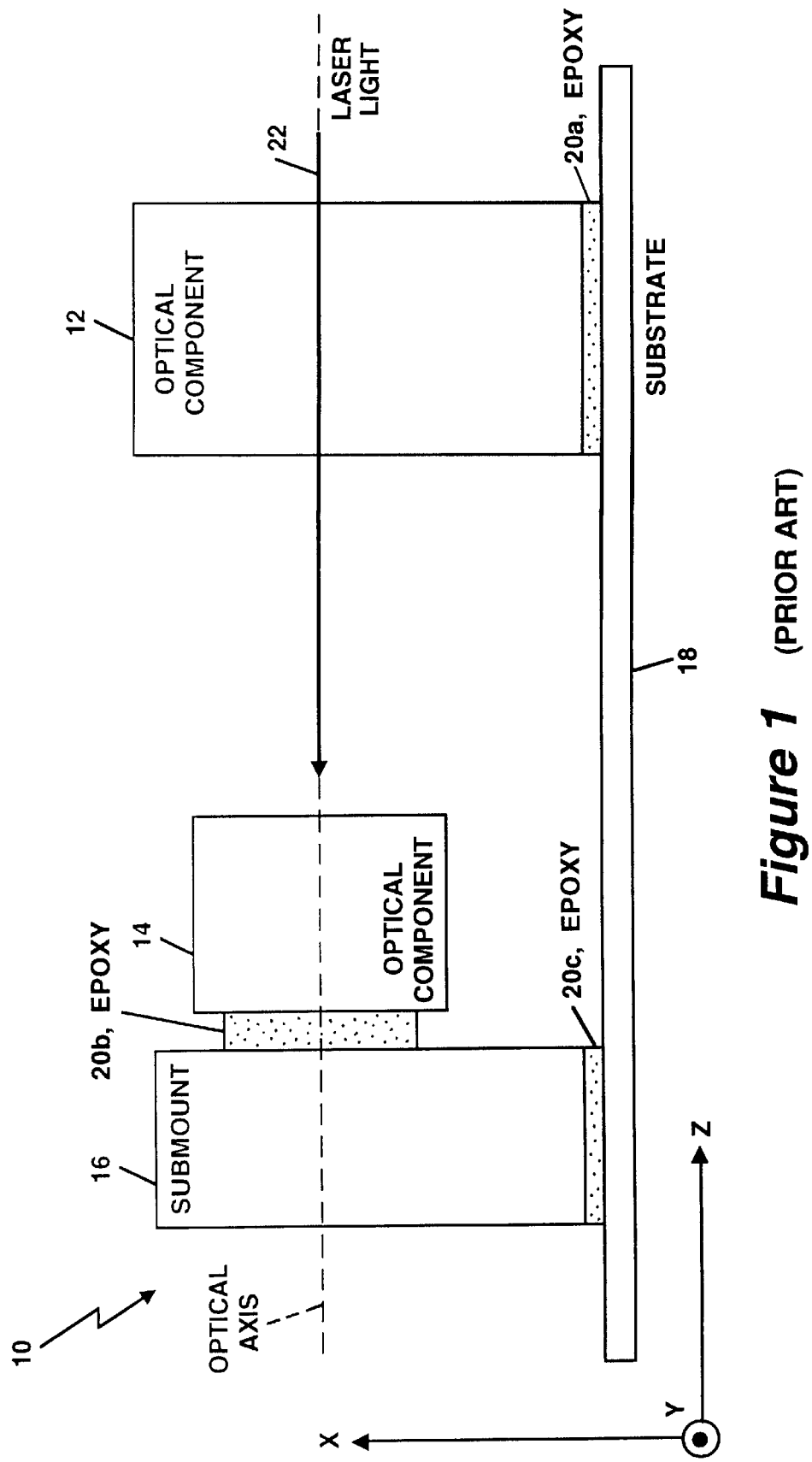
FIG. 1 is a block diagram of a configuration of aligned optical components.

Referring to FIG. 1, a block diagram of a configuration 10 of aligned optical components 12 and 14 is shown in relation to the device substrate 18, component submount 16 and the epoxy 20a-c that fixes each in place. Optical components 12 and 14 are not limited to any particular type of optical component however, for exemplary purposes, optical component 12 can be a lens and optical component 14 can be a vertical cavity surface emitting laser (VCSEL). With such an arrangement, the lens 12 focuses pump laser light 22 into the cavity of VCSEL 14. Alternatively, optical components 12 and 14 could be a pair of lenses, which collectively is part of a larger configuration of optical components.

Regardless of the type of component, in order for the overall configuration to operate efficiently, optical component 14 should be optimally aligned with optical component 12 along the optical axis in three dimensions (X, Y and Z). (While it is known in the art, it should be noted that the symbol associated with the Y axis in FIG. 1 indicates that it is orthogonal to the X-Z plane).

Once such optimal alignment is achieved, optical component 14 is attached to submount 16. Simultaneously, the entire structure is attached to substrate 18.

The alignment process used in the prior art allows optical components 12 and 14 to be precisely aligned. However, such a process does not allow simultaneous active alignment along all three axis. More precisely, the aforementioned alignment process includes several independent stages of X-Y-Z motion. These stages each include motion along the X, Y and Z axis of a single component. For example, the first stage includes the positioning and attaching of the submount 16 to the substrate 18, using a typical accuracy of less than 10 microns. The second stage includes the positioning of optical component 14 relative to submount 16. A third stage is also used to position optical component 12 in relation to optical component 14. Accordingly, an improvement to this type of process is one where several components are moved along the X, Y and Z axis at the same time, allowing the alignment process to more quickly converge on an optimum alignment.

Figure 2:
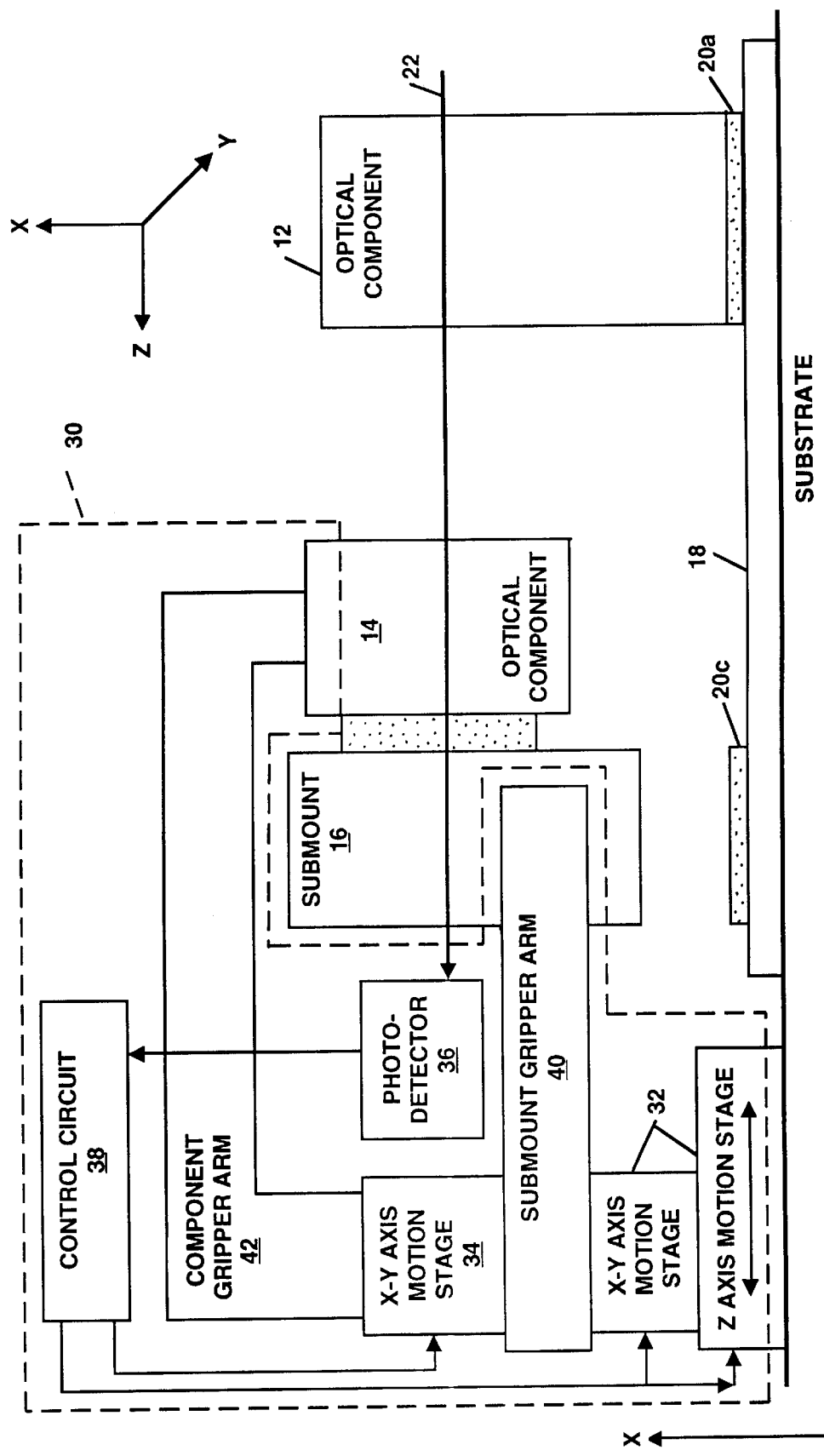
FIG. 2 is a block diagram of a system for performing active three-dimensional alignment of the components of FIG. 1.

Referring now to FIG. 2, a block diagram of a system 30 for performing active three-dimensional opto-mechanical alignment and attachment of optical components for fiberoptic devices is shown in relation to optical components 12 and 14. The system 30 includes a compound movement stage including a bottom servo-driven X-Y-Z motion stage 32 and a top, servo-driven X-Y motion stage 34. The servo-drive for top motion stage 34 is generated through a feedback loop that includes a photodetector 36 and a control circuit 38, the output of which is conveyed to top motion stage 34.

The bottom X-Y-Z motion stage 32 is coupled to a gripper arm referred to as the submount gripper arm 40. The top X-Y motion stage 34 is effectively mounted on the bottom X-Y-Z motion stage 32 such that the X-Y plane in which motion stage 34 can move is perpendicular to the Z-axis movement of bottom stage 32. Additionally, a second gripper arm referred to as the component gripper arm 42 is directly attached to top motion stage 34. The system 30 allows the submount 16 and optical component 14 to move as a unified assembly in the X, Y and Z directions while optical component 14 can move independently in the X-Y plane along the surface of the submount 16.

Three dimensional optimization of the position of optical component 14 is achieved by passing light beam 22 through components 12 and 14 and onto photodetector 36. It should be noted that optical component 12 has previously been aligned to light beam 22. A search operation is performed wherein the power detected by photodetector 36 is monitored while the top motion stage 34 is moved in a predetermined pattern in the X-Y plane. Once the optimization in X-Y plane is complete, bottom motion stage 32 starts moving along the Z axis in predetermined increments. Each time bottom motion stage 32 is moved, the top motion stage adjusts the position of component 14 until the power detected by photodetector 36 is maximized. That process is repeated for a number of predetermined increments along the Z-axis. Once completed, the top 34 and bottom 32 motion stages are returned to the position where the highest optical power was detected.

Figure 3:
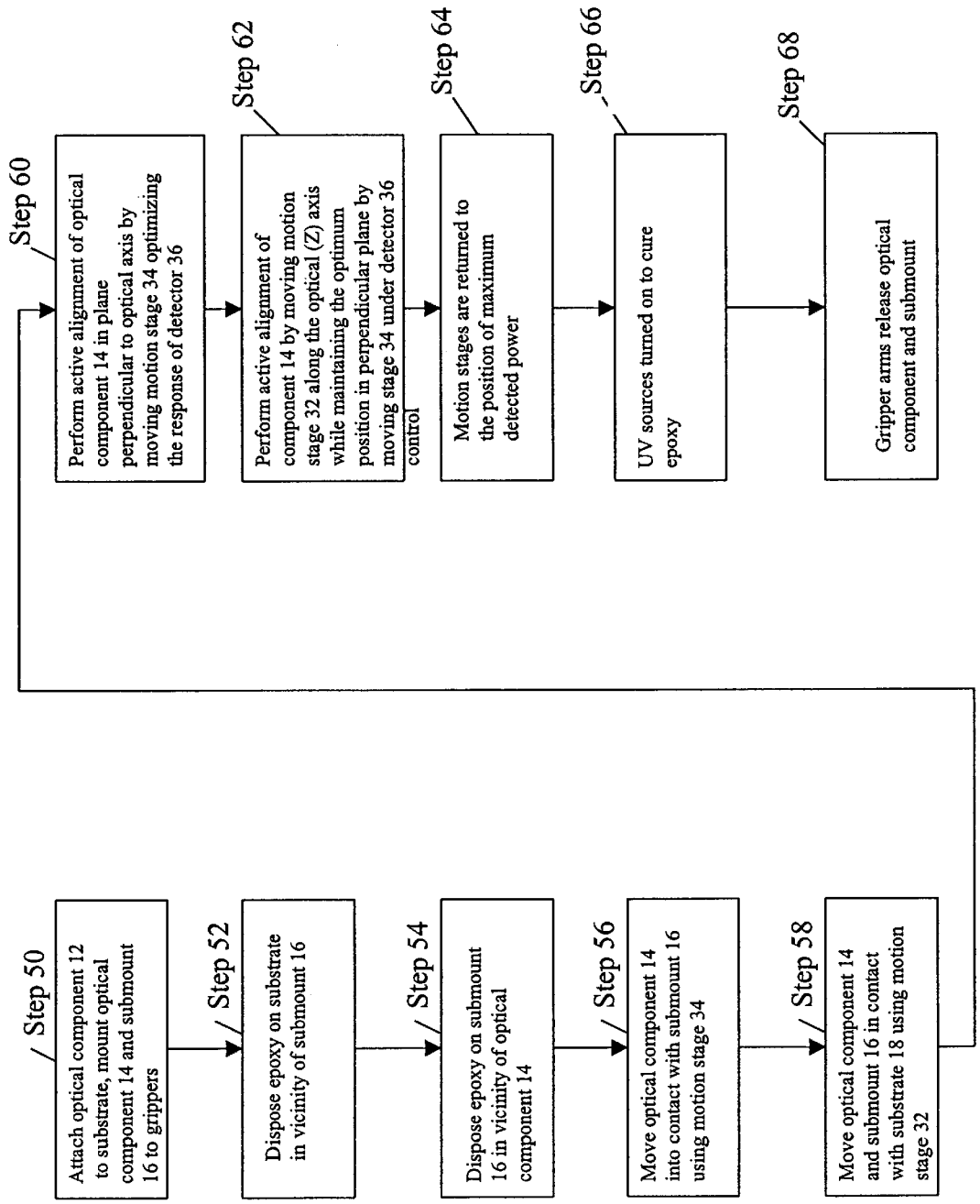
FIG. 3 is a flow diagram showing the operation of the system of FIG. 2.

More specifically, referring to FIG. 3, the operation of system 30 procedes as follows. The system 30 is initialized by attaching optical component 12 to substrate 18, mounting optical component 14 in gripper arm 42 and mounting submount 16 in submount gripper arm 40 (Step 50). Subsequently, epoxy is disposed on substrate 18 in the general vicinity where submount 16 will be positioned (Step 52). Epoxy is also disposed on submount 16 in the vicinity where optical component 14 will be positioned (Step 54). Once the components are coupled to the grippers and the epoxy is disposed, control circuit 38 transmits a signal to X-Y motion stage 34 that causes it to move optical component 14 into contact with submount 16 (Step 56). Additionally, the bottom X-Y-Z motion stage 32 receives a signal that causes it to move the assembly of optical component 14 and submount 16 to the vicnity on substrate 18 where it will be positioned (Step 58). It should be noted that optical component 14 and submount 16 move together at this point in the process since they are both essentially mounted on bottom X-Y-Z motion stage 32. At this point in the process, the simultaneous X-Y-Z alignment operation can begin.

Next, active alignment is initiated in the plane perpendicular to the optical axis (i.e. the X-Y plane). During the active alignment process, control circuit 38 transmits signals to the top motion stage 34 that responsively moves the components in relation to the by photodetector 36. Using the top X-Y motion stage 34, driven by the feedback loop, optical component 14 is moved relative to the substrate 18 until photodetector 36 detects maximum optical power(Step 60). Once maximum power is detected, the position of optical component 14 and submount 16 is moved along the Z axis by manipulating the bottom motion stage 32. Simultaneously, top motion stage 34 moves component 14 in the X-Y plane until a power maxima is recorded (Step 62). That motion results in the coordinated movement of optical component 14 and the submount 16 as one assembly. However, as that motion occurs, the top X-Y motion stage 34 will continue to move optical component 14 relative to submount 16 in response to the output of photodetector 36 and, hence, the feedback loop. After the bottom motion stage 32 has moved through a desired distance range along the Z-axis, it is returned to the Z-axis position of maximum recorded optical power. The top motion stage 34 is also returned to the position of maximum recorded optical power in the X-Y plane (Step 64). In this manner, alignment is achieved along the X, Y and Z axis simultaneously.

Once optimal alignment is achieved, UV light sources are turned on to begin the epoxy cure process, fixing the position of submount 16, optical component 14 and optical component 12 (Step 66). Next, gripper arms 40 and 42 are signaled to release the associated components, and the entire assembly is ready for post cure operations (Step 68).

The present invention provides numerous advantages such as allowing true three dimensional active alignment and ensuring coordinated motion of the components during that alignment process without the need for complex and expensive control circuits. It also allows the epoxy layers to remain relatively thin such that shrinkage during the curing process is avoided. In addition, the system is compact and easy to implement, i.e. it has a small footprint which reduces ABBE errors. Finally, the present invention reduces the cost and complexity of the alignment equipment.

It should be noted that the system described hereinabove could be modified without departing from the scope of the present invention. For example, system 30 can be used to align devices other than optical components. Additionally, the submount can be manufactured of more than one piece. Further, a different mechanical arrangement can be used to achieve a similar motion of the components, i.e. simultaneous motion of the individual components along the X, Y and Z axis. Further still, it is anticipated that the top motion stage 34 can be an X-Y-Z motion stage as opposed to simply an X-Y motion stage.

Additionally, the feedback system can incorporate a device other than a photodetector to measure optical power or another selected characteristic of reference light signal 22. In fact, other optical parameters such as wavelength, side mode suppression, full width at half maximum of a pass band, in isolation or combination, can be used to optimize alignment. Further, the present invention can be used for performing other positioning, aligning and attachment operations . Components attachment methods other than UV cured epoxy can be utilized. The axis of motion of the top and bottom stages can be not parallel to each other depending on the optical alignment and components mounting requirements.

It will be recognized that many configurations similar to those described above can be designed using different values, combinations and architectures which will yield the same results as the claimed invention. Thus, while this invention has been particularly shown and described with references to preferred embodiments herein, it is understood by those skilled in the art that various changes in form and details may be made therein without departing from the scope of the invention as defined by the appended claims.

We claim:

1. An apparatus for precision alignment of a first component with a second component that is optimally aligned with a reference signal, comprising:
 a detector, positioned to receive the reference signal for measuring a characteristic of said reference signal in response to changes in the position of said first component;
 a mounting structure to which said first component is attached after said first component is aligned to the reference signal, said mounting structure being attached to a first motion stage that can be controlably moved to adjust the distance between said first and said second components; and
 a second motion stage, mounted on said first motion stage so as to move therewith, and attached to said first component, said second motion stage being controlably moveable in response to the changes in said characteristic determined by said detector such that a location of said first component is adjusted until said measured characteristic of said reference signal is optimized.

2. An apparatus, as described in claim 1, wherein said distance between said first and said second component is adjusted in a predetermined pattern while said location of said first component is being adjusted to optimize said measured characteristic.

3. An apparatus, as described in claim 2, wherein said second component is fixed at a predetermined location on a device substrate.

4. An apparatus, as described in claim 1, wherein said second motion stage is capable of moving said first component in a plane defined by the face of the mounting structure.

5. An apparatus, as described in claim 2, wherein said second motion stage is capable of moving along the axis that is orthoganol to said plane.

6. An apparatus, as described in claim 1, further comprising:
 a control circuit for receiving a signal from said detector that indicates a relative measure of the characteristic of said reference signal, said control circuit generating a control signal received by the first motion stage indicating a direction to move the first component in order to optimize said measured characteristic.

7. An apparatus, as described in claim 6, wherein said direction to move the first component is a portion of a search pattern used to identify the position of said first component that optimizes said measured characteristic.

8. An apparatus, as described in claim 1 wherein said first component is an optical component.

9. An apparatus, as described in claim 2 wherein said second component is an optical component.

10. An apparatus, as described in claim 1 wherein said first motion stage is capable of moving along the axis orthoganol to said plane.

11. An apparatus, as described in claim 1, wherein said detector is a photodetector and said measured characteristic of said reference signal is its optical power.

12. A method for optimally aligning a first element and a second element, comprising:
 fixing said first element at a selected location on a substrate;
 attaching said second element to a first motion stage, and attaching a mounting structure to a second motion stage, wherein said first and said second motion stages are coupled for synchronous movement;
 transmitting a reference signal that is optimally aligned to said first element and is received by said second element and by a detector, said detector positioned to measure a selected characteristic of said reference signal due to changes in the position of said second element; and
 moving said second element, by said first and second motion stages, until said characteristic of said reference signal is optimized.

13. A method, as described in claim 12, wherein said moving step further comprises: monitoring said characteristic of said reference signal as said second element and said mounting structure are moved; and
 determining, repetitively, a location to move said second element and said mounting structure in response to the result of said monitoring step until said characteristic of said reference signal is optimized.

14. A method, as described in claim 13, further comprising:
 fixing said mounting structure to said substrate at the location where said characteristic of said reference signal is optimized; and
 fixing said second element to said mounting structure at the location where said characteristic of said reference signal is optimized.

15. A method, as described in claim 12 wherein said first element is an optical component.

16. A method, as described in claim 12 wherein said second element is an optical component.

17. A method, as described in claim 12 wherein said first motion stage is capable of moving said first component in a plane defined by the face of the mounting structure.

18. A method, as described in claim 12 wherein said second motion stage is capable of moving along an axis that is orthoganol to said plane.

19. A method, as described in claim 12, wherein said detector is a photodetector and said measured characteristic of said reference signal is its optical power.

* * * * *